United States Patent [19]

Ouchi et al.

[11] Patent Number: 5,793,198
[45] Date of Patent: Aug. 11, 1998

[54] ROLLING BEARING UNIT WITH ROTATING SPEED SENSOR

[75] Inventors: Hideo Ouchi; Kouichi Morita, both of Fujisawa, Japan

[73] Assignee: NSK Ltd., Tokyo, Japan

[21] Appl. No.: 640,035

[22] Filed: Apr. 30, 1996

[30] Foreign Application Priority Data

May 10, 1995 [JP] Japan ................... 7-111674

[51] Int. Cl.$^6$ ......................................... G01B 7/00
[52] U.S. Cl. ............................. 324/174; 324/207.25
[58] Field of Search ................. 324/207.25, 207.24, 324/207.2, 173, 174, 165; 384/446, 448, 486, 485, 482

[56] References Cited

U.S. PATENT DOCUMENTS

| | | | |
|---|---|---|---|
| 3,916,326 | 10/1975 | Woyton | 324/165 |
| 4,142,153 | 2/1979 | Smith | 324/165 |
| 4,795,278 | 1/1989 | Hayashi | 324/174 |
| 5,011,303 | 4/1991 | Caron | 324/207.25 |
| 5,017,868 | 5/1991 | Hajzler | 324/207.25 |
| 5,046,867 | 9/1991 | Hilby et al. | 324/207.25 |
| 5,085,519 | 2/1992 | Dougherty | 324/173 |
| 5,127,747 | 7/1992 | Hilby et al. | 324/207.25 |
| 5,385,410 | 1/1995 | Shirai et al. | 324/174 |
| 5,407,213 | 4/1995 | Ouchi et al. | 324/207.25 |
| 5,567,058 | 10/1996 | Morita et al. | 324/174 |
| 5,602,335 | 2/1997 | Ouchi | 324/174 |
| 5,603,575 | 2/1997 | Ouchi | 324/174 |

FOREIGN PATENT DOCUMENTS 63-50759  3/1988  Japan ..................... 324/165

*Primary Examiner*—Christine K. Oda
*Attorney, Agent, or Firm*—Evenson, McKeown, Edwards & Lenahan, P.L.L.C.

[57] ABSTRACT

A rolling bearing unit with rotating speed sensor comprising a stationary ring having a first raceway, a rotatable ring placed concentric with the stationary ring and having a second raceway, a plurality of rolling elements provided between the first and second raceways, a magnetic tone wheel supported by the rotating ring to rotate together with the rotating ring and having cutouts for an encoder portion, and a sensor supported by the stationary ring to be opposed to the tone wheel and having a detecting portion opposed to the encoder portion with a small gap therebetween, wherein the cutouts are produced through a punching stroke from the side of the magnetic metal plate which is not faced to the small gap to the side of the magnetic metal plate which is faced to the small gap in the assemble state.

3 Claims, 9 Drawing Sheets

ROLLING BEARING UNIT WITH ROTATING SPEED SENSOR

FIELD OF THE INVENTION

The present invention relates to a rolling bearing unit with rotating speed sensor, for example, to rotatably support a vehicle wheel on a suspension apparatus while detecting the rotating speed of the wheel.

DESCRIPTION OF THE RELATED ART

Various types of the rolling bearing units with rotating speed sensor are known in the art to detect the rotating speed of a vehicle wheel so as to control the anti-lock brake system (ABS), or traction control system (TCS) while rotatably supporting the vehicle wheel on the suspension apparatus. For example, Japanese Utility Model Application No. H5-48365 discloses a rolling bearing unit with rotating speed sensor as shown in FIG.8.

In the rolling bearing unit with rotating speed sensor of a first example in the prior art as shown in FIG. 8, a hub 1 has a flange 2 for wheel fixture provided on its axially outer end portion (the left side end in FIG. 8).

The term "axially outer" in the present specification means the widthwise outer side when fitted to a vehicle.

A second raceway, specifically inner ring raceway 3a is formed on a central outer peripheral face of the hub 1. An inner ring 5 with another second raceway, specifically inner ring raceway 3b formed on the outer peripheral face thereof is fitted on the central outer peripheral face of the hub 1.

A thread portion 6 is formed in an outer peripheral face of the axially inner end portion (the right side end in FIG. 8) of the hub 1.

The term "axially inner" in the present specification means the widthwise central side when fitted to a vehicle.

A nut 7 is threaded to the thread portion 6 to press the axially inner end portion of the above inner ring 5 with this threading, so that the inner ring 5 is engaged with the step portion 4 and fixed at a predetermined location on the outer peripheral face of the hub 1.

An outer ring 8 having an attachment portion 9 on its outer peripheral face to be supported by a suspension unit (not shown) is formed with a double row of outer ring raceways 10a, 10b on the inner peripheral face thereof.

A plurality of rolling elements 11 is provided between the above inner ring raceways 3a, 3b, and the outer ring raceways 10a, 10b, respectively. Accordingly, the hub 1 for fixing the vehicle wheel is rotatably supported inside the outer ring 8 which is supported on the suspension unit (not shown).

Moreover, the inner ring raceway 3a can be, instead of being directly formed on the outer peripheral face of the hub 1, formed on an inner ring (not shown) different from the hub 1, so that the inner ring and the above inner ring 5 may be fitted and fixed to the hub 1.

And, in the example shown the figure, the rolling elements 11 provided between the hub 1 and the outer ring 8, is in the form of balls, but when a bearing unit for use in heavy vehicles, tapered rollers may be used, instead of balls, for the rolling elements 11.

A tone wheel 13 which is cylindrically formed from a magnetic material, specifically steel plate, is fitted and fixed in the axially inner end portion of the above hub 1. The tone wheel 13 is formed with a smaller diameter portion 14 and a larger diameter portion 15 connected with a step portion 16 to each other in a concentric relationship. In the larger diameter portion 15, a plurality of through holes 19 are formed with the same pitch in the circumferential direction, so that the magnetic characteristic of the larger diameter portion 15 is changed alternately with the same pitch over the circumferential direction.

A cover 18 is fixed to cover the opening on the axially inner end portion of the outer ring 8, and a sensor 20 is fixed to the cover 18 so that the inner peripheral face of the radially outer half portion of the sensor 20 is opposed to the outer peripheral surface of the larger diameter portion 15.

The larger diameter portion 15 formed with the cutouts, specifically the through holes 19, is an encoder portion. And the inner peripheral face of the radially outer half portion of the sensor 20 opposed to the through holes 19 is a detecting portion.

In FIG. 8, a seal ring 12 to prevent dust and so on from entering into the space where the rolling elements 11 are provided. And, a connector 30 is provided to take out a detection signal of the sensor 20.

When a rolling bearing unit with rotating speed sensor in the first example in the prior art is used, a vehicle wheel is fixed in the flange portion 2 provided on the axially outer end portion of the hub 1, that is a rotating ring, and rotatably supported with respect to the suspension unit by which an outer ring 8, that is a fixed ring, is supported.

The tone wheel 13 which is fitted and fixed to the hub 1 rotates as the vehicle wheel (not shown) rotates, so that the output of the sensor 20 opposed to the through holes 19 formed on the larger diameter 15 of the tone wheel 13 changes. The frequency at which the output of the sensor 20 changes is proportional to the rotating speed of the vehicle wheel, and accordingly if the output signal of the sensor 20 is input into a controller (not shown), the rotating speed of the vehicle wheel can be obtained to control the ABS and TCS adequately.

The various kinds of tone wheel and sensor are known in the prior art beyond the example. Particularly, what is called the passive type, which uses a magnetic material for the tone wheel, so that the voltage generated in the coil of the sensor is changed as the tone wheel rotates, is widely used because of not using an expensive component member. It is known in the prior art for example, in HATSUMEI KYOKAI Open Technical Report No. 94-16051 that the sensor is formed in a circle shape to increase the output of sensor in the rotating speed sensor of these passive type.

The FIGS. 9 and 10 show the rolling bearing unit with a rotating speed sensor as a second example in the prior art, specifically mentioned in the open technical report mentioned above. With the second example construction, the base end portion (left side portion of FIGS. 9 and 10) of the tone wheel 13 is fitted and fixed to the axially inner end portion of the inner ring 5 spaced from the inner ring raceway 3b. The tone wheel 13 is formed generally in a circle shape (a short cylinder shape) from a magnetic metal plate. The tone wheel 13 is formed with a smaller diameter portion 14 and a larger diameter portion 15 connected concentrically with each other by a step portion 16.

The tone wheel 13 is supported and fixed to the inner ring 5 such that the larger diameter portion 15 is fitted to the end edge portion of the outer peripheral face of the inner ring 5, and the step portion 16 is engaged with the end edge portion of the inner ring 5. Accordingly, the smaller diameter portion 14 is supported concentric to the inner ring 5.

And, the smaller diameter 14 is formed with a plurality of cut-outs, specifically through holes 19, with the same pitch all over its circumferential direction, so that the magnetism characteristic is made all over its circumferential direction to change alternately and with the same pitch. The through holes 19 are formed in the same shape, specifically in a rectangular shape which is longer in an axial direction (right and left direction of FIGS. 9 and 10).

The smaller diameter portion 14 formed with the through holes 19 is an encoder portion. In FIGS. 9 and 10, one through hole 19 only is illustrated for simplification.

The opening at the axially inner end of the outer ring 8 is sealed with a cover 18 formed in a bottomed cylindrical shape by processing a metal plate of an stainless steel plate, an aluminum alloy plate etc. in a deep-drawing process.

The cover 18 comprises a cylindrical portion 4. Maintained and fixed on the internal circumference side of the cylindrical portion 40 is an annular synthetic resin block 21 in which the annular sensor 20 is embedded.

The sensor 20 is provided with a permanent magnet 22, a stator 23 made of a magnetic material of steel plate etc. and a coil 24, which are all formed in a circle shape and embedded in the above synthetic resin 21.

The permanent magnet 22 is formed generally in a circle shape (in a ring shape), and magnetized in the diameter direction (up and down direction of FIGS.9 and 10). And, the inner peripheral face of the permanent magnet 22 is opposed across a small clearance 25 to an outer peripheral face portion which is not formed with the through holes 19 at the base end portion (left end portion in FIG.10) of the smaller diameter portion 14 of the tone wheel 13.

Moreover, the stator 23 comprising a cylindrical portion 26 and cylindrical portion 27 is formed generally in a circle shape, and its cross section is formed substantially in a J shape.

The end portion of an inner peripheral face of the cylindrical portion 26 on the outside diameter side of the stator 23 is placed close to or in contact with an outer peripheral face of the permanent magnet 22. And, the inner peripheral face of the cylindrical portion 27 on the inner diameter side of the stator 23 is opposed to the cutout portion in the tone wheel 13 where the through holes 19 are formed. Moreover, the cylindrical portion 27 on the inside diameter side is formed with a plurality of cutouts, specifically notches 28, all over the circumferential direction of the cylindrical portion 27 with the same pitch to that of the through holes 19 (the central angle pitch). Accordingly, the cylindrical portion 27 in the inner diameter side is formed in a comb-teeth shape.

The cylindrical portion 27 on the inner diameter side formed with the notches 28 is a detecting portion.

Furthermore, the coil 24 is formed in a circle shape by rolling up a conductive wire around a bobbin 29 made of a non-magnetic material, and it is located on the inner peripheral portion of the cylindrical portion 26 on the outside diameter side. The electromotive force generated in the coil 24 is taken out through a connector 30 that is protruded from and attached to the outside surface of cover 18.

When a rolling bearing unit with rotating speed sensor of the second example in the prior art composed like above is used, as the tone wheel 13 rotates with a hub 1, the density of the magnetic flux in the stator 23 that is opposed to the tone wheel 13 changes, so that the voltage induced in the coil 24 changes with a frequency in proportion to the rotating speed of the hub 1.

The principle of the voltage change in the coil 24, corresponding to the density change of the magnetic flux flowing through the stator 23, is the same as in the case of the sensors for rotating speed detection widely known in the prior art.

The reason that the density of the magnetic flux flowing in the stator 23 changes according to the rotation of the tone wheel 13 is as follows:

There is a moment that both the through holes 19 provided on the tone wheel 13 and the notches 28 provided on the stator 23 are opposed to each other all over their circumference at the same time as the tone wheel 13 rotates because their pitches are the same. And at the moment that these through holes 19 and notches 28 are opposed to each other, the magnetic column portion existing between the adjacent through holes 19 and the magnetic tongue portion existing between the adjacent notches 28 are opposed to each other across the small clearance 25.

In this way, in the condition where the magnetic column portion and the magnetic tongue portion are opposed to each other, a high density of magnetic flux flows between the tone wheel 13 and the stator 23.

Oppositely, when the phase of the through holes 19 and the notches 28 is displaced by half, the density of magnetic flux flowing between the tone wheel 13 and the stator 23 becomes low. That is, in this condition, the notches 28 provided on the stator 23 are opposed to the above column portions, at the same time that the through holes 19 provided on the tone wheel 13 are opposed to the above tongue portions.

In this way, in the condition that the column portions are opposed to the notches 28 while the tongue portions are opposed to the through holes 19, a comparatively large air space exists between the tone wheel 13 and the stator 23 all over its circumference. And, in this condition, the density of the magnetic flux flowing through the tone wheel 13 and stator 23 becomes low.

As a result, the voltage induced in the coil 24 mentioned above changes in proportion to the rotating speed of the hub 1 mentioned above.

The permanent magnet 22, stator 23 and coil 24 in the sensor 20 are respectively formed in a circle shape surrounding the circumference of the tone wheel 13. And, the magnetic flux appearing from the permanent magnet 22 is made to flow all over the circumference of the stator 23.

Because of this, the amount of magnetic flux flowing through the whole stator 23 can be sufficiently large.

Accordingly, the change of voltage generated in the coil 24 corresponding to the density change of the magnetic flux passing the stator 23 can be larger.

In the rolling bearing unit with the rotating speed sensor mentioned above, the encoder portion of the smaller diameter portion 14 etc. of the tone wheel 13 and the detecting portion of the cylindrical portion 27 on the inside diameter side etc. of the stator 23 are formed with the cutouts, such as through-holes 19 and notches 28 by the process where part of magnetic metal plate such as steel sheet etc. composing of these tone wheel 13 and stator 23 is punched. When the member of the above smaller diameter portion 14 and the cylindrical portion 27 etc. are placed under the punch press to form these cutouts, a burr (sagging) is developed on the front side surface (surface opposed to a punch) in the punching direction of the cutout portion, while a flash is developed on the back side surface (surface supported by a support die) in the punching direction of the cutout portion.

In case of the prior art rolling bearing unit with a rotating speed sensor, the punching direction has not been taken into consideration when forming the cutouts such as through holes 19, notches 28 etc. Because of this, the rotating speed sensor was constructed in which the cutout portion having the above sagging on its surface was opposed to the small clearance 25.

In this way, when the surface in the cutout portion having the above sagging produced is opposed to the small clearance 25, the output voltage generated in the sensor 20 is decreased. Specifically, the output voltage of the sensor 20 is in proportion to the change speed of magnetic flux which flows cross the coil 24 of the sensor 20. However, when the sagging exists in the surfaces opposed to each other, this change speed can not be large, and the output voltage falls.

The present invention is contrived in view of the circumstances mentioned above to raise the output voltage of the sensor by regulating its punching direction when the cutouts are formed.

SUMMARY OF THE INVENTION

The rolling bearing unit with rotating speed sensor in this embodiment comprises a stationary ring having a first raceway on its peripheral surface, a rotatable ring placed concentric with the stationary ring and having a second raceway on its peripheral surface, such that the first and second raceways are opposed to each other, a plurality of rolling elements provided between the first and second raceways, a magnetic tone wheel supported by the rotating ring to rotate together with the rotating ring, and a sensor supported by the stationary ring to be opposed to the tone wheel and having a detecting portion while the tone wheel has an encoder portion, such that the detecting portion and the encoder portion are opposed to each other with a small gap therebetween, and that at least one member of the detecting portion and encoder portion has a plurality of cutouts which are formed through a punching process where the punching stroke is controlled in direction with reference to the small gap.

Moreover, at least one member of the detecting portion and encoder portion are formed with a plurality of cutouts by which the magnetic characteristics in a circumferential direction are changed alternately and with the same pitch.

BRIEF DESCRIPTION OF THE DRAWINGS

FIG.3(A) for before punching, FIG.3(B) for after punching, and FIG.3(C) for after bending.

DETAILED DESCRIPTION OF THE PREFERRED EMBODIMENT

The rolling bearing unit with rotating speed sensor in this embodiment comprises a stationary ring having a first raceway on its peripheral surface, a rotatable ring placed concentric with the stationary ring and having a second raceway on its peripheral surface, the first and second raceways being opposed to each other, a plurality of rolling elements provided between the first and second raceways, a magnetic tone wheel supported by the rotating ring to rotate together with the rotating ring, and a sensor supported by the stationary ring to be opposed to the tone wheel. The sensor has a detecting portion while the tone wheel has an encoder portion, such that the detecting portion and the encoder portion are opposed to each other with a small gap therebetween.

The rolling bearing unit with rotating speed sensor is referred to as the speed sensing rolling bearing unit hereinafter.

Moreover, at least one member of the detecting portion and encoder portion are formed with a plurality of cutouts by which the magnetic characteristics in a circumferential direction are changed alternately and with the same pitch.

In particular, in the rolling bearing unit with rotating speed sensor in the present invention, at least one member of members formed with the cutouts is produced by a magnetic metal plate, through a punching stroke from the side which is not faced to the small gap to the side which is faced to the small gap in the assembles state.

The speed sensing rolling bearing unit according to the present invention constructed as described rotatably supports a wheel on a suspension unit. Moreover the operation itself at the time of detecting the rotational speed of the wheel is the same as for the beforementioned conventional speed sensing rolling bearing unit. However, with the speed sensing rolling bearing unit of the present invention, at the time of forming a plurality of cutouts in at least one of the tone wheel and the member constituting the detection portion of the sensor, the punching direction is controlled so that the surface with the sagging does not oppose the small gap. As a result, the rate of change of the magnetic flux density, which affects the output voltage of the sensor, is increased so that sensor output is improved.

Figure 1:
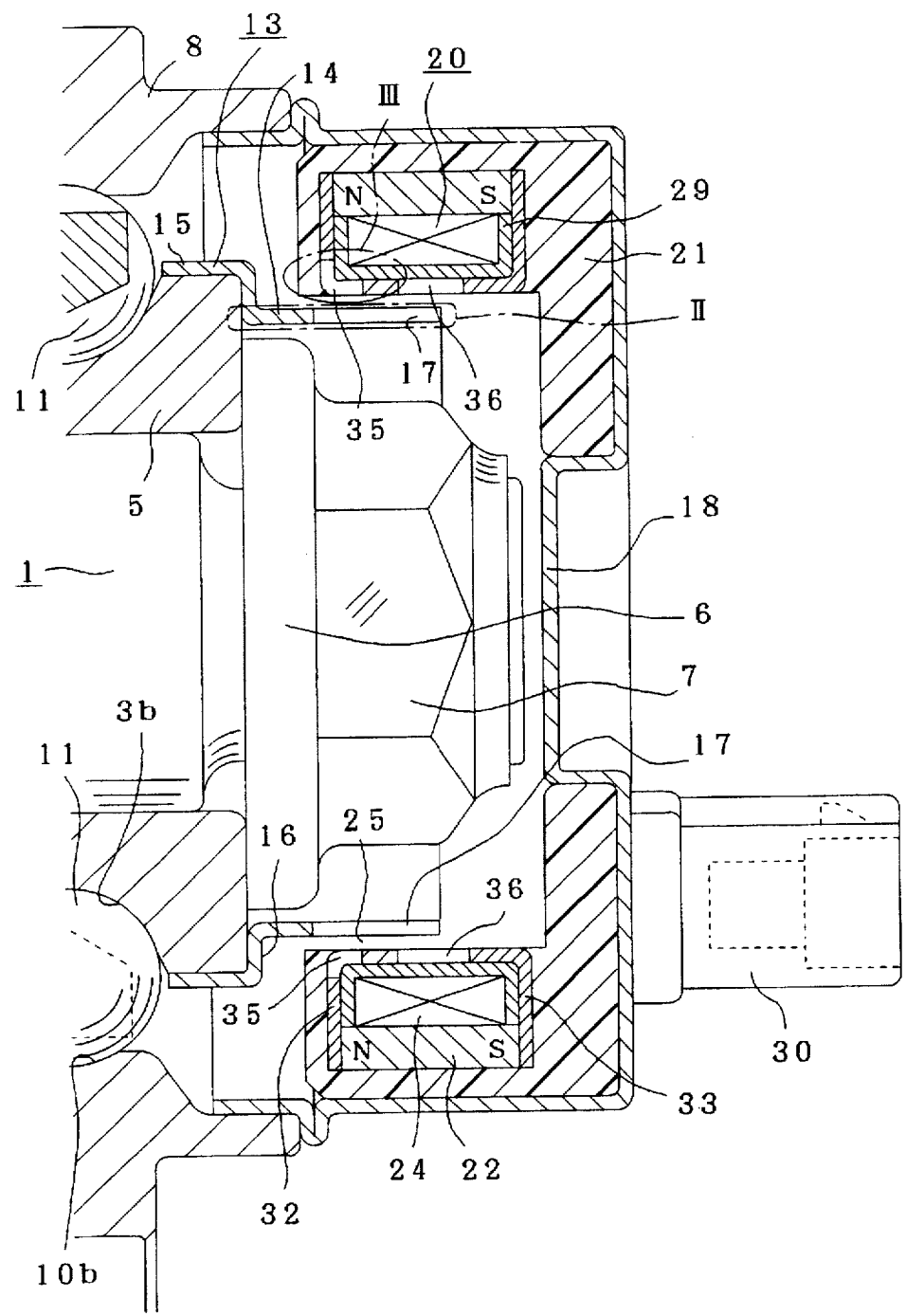
FIG. 1 is a cross-sectional view of the main components of a first embodiment of the present invention.
Figure 2:
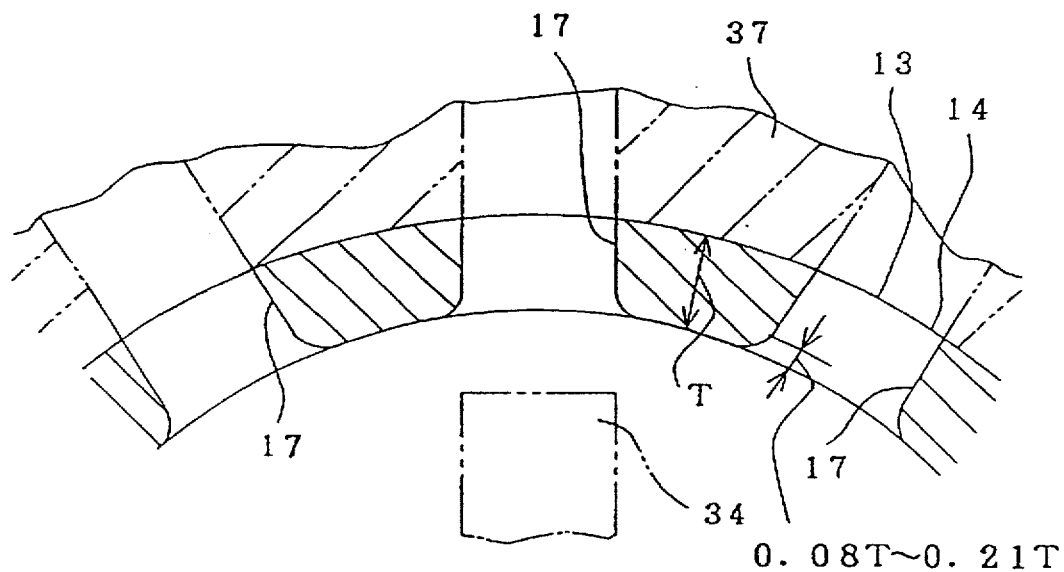
FIG. 2(A) and FIG.2(B) are a partial cross-sectional view showing a condition for forming cutouts in part (II) of FIG. 1, and also showing formed cutouts.
Figure 2:
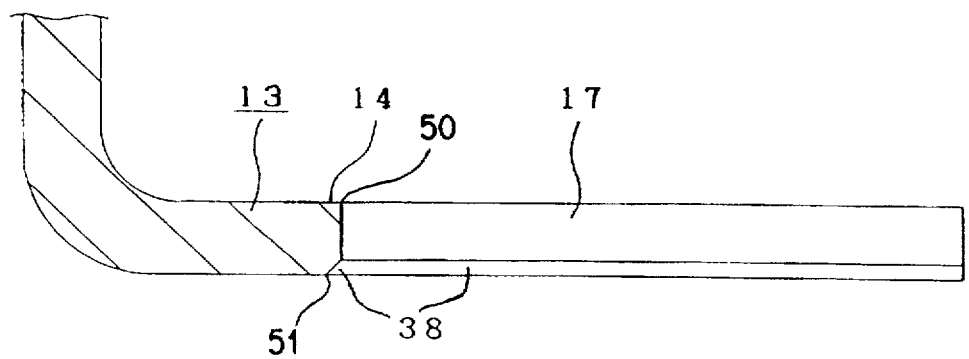
Figure 3:
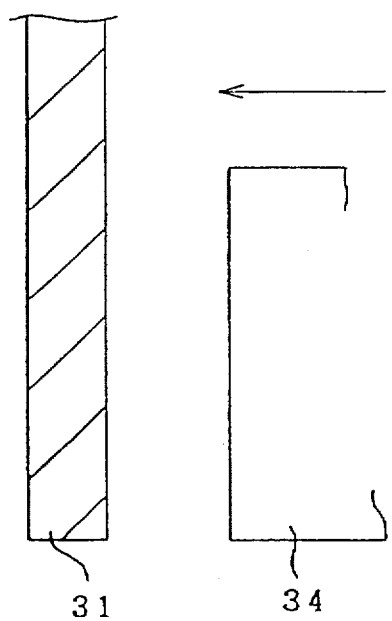
FIG. 3(A), FIG.3(B) and FIG.3(C) are a cross sectional view for illustrating an example of the successive operations in forming cutouts in part (III) of FIG. 1.
Figure 3:
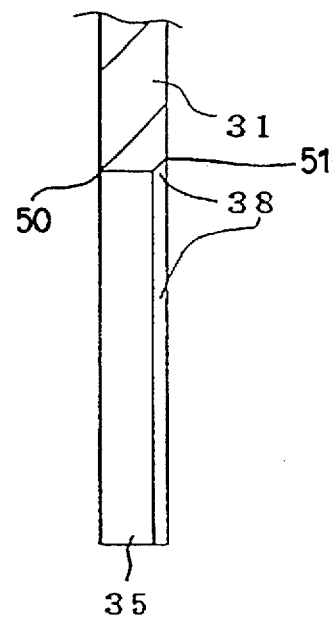
Figure 3:
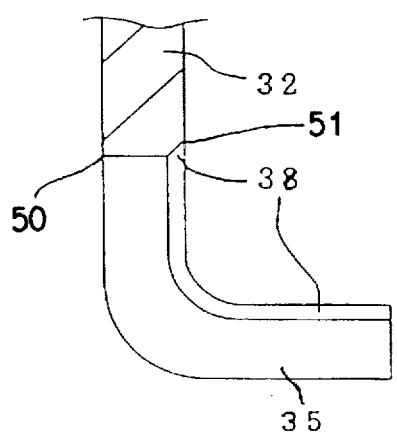

FIGS. 1 through 3 show a first embodiment of the present invention. The feature of the speed sensing rolling bearing unit according to the present invention is that when punching part of a magnetic metal plate such as a steel plate to form the cutouts, the punching direction is controlled. Details of the construction of the other parts is substantially the same as for the beforementioned conventional construction. Therefore similar parts are indicated by the same symbol and repeated description is omitted for brevity. As follows is a description centered on the characteristic parts of the present invention.

A tone wheel 13 comprises a smaller diameter portion 14 and a larger diameter portion 15 connected to each other by a step portion 16.

A sensor 20 constituting a rotational speed detection unit comprises; a permanent magnet 22, first and second stators 32, 33 formed in respective L-shapes in cross-section from steel plate, and a coil 24. The permanent magnet 22, first stator 32, second stator 33 and coil 24 are respectively formed in an annular shape, and embedded in a synthetic resin block 21. The permanent magnet 22 is magnetized axially (left/right direction in FIG. 1) around the overall periphery with the magnetized direction unchanged therearound.

The outer diameter tip portion on the axially inner side face of the first stator 32 is abutted against the axially outer end face (left end face in FIG. 1) of the permanent magnet 22, while the inner diameter tip portion of the first stator 32 opposes a central portion of the smaller diameter portion 14 across a small gap 25 of less than 1 mm; for example around 0.5 mm.

The outer diameter tip portion on the axially outer side face of the second stator 33 is abutted against the axially inner end face (right end face in FIG. 1) of the permanent magnet 22, while the inner diameter tip portion of the second stator 33 opposes the tip end (right end in FIG. 1) of the small diameter portion 14, again across the small gap 25.

Cut-outs 35, 36 are formed in the first and second stators 32, 33, respectively, at even spacing around the peripheral direction. The cut-outs 35, 36 are made so as to oppose the cutout portion formed with the cut-outs 17 on the smaller diameter portion 14 serving as the encoder portion of the tone wheel 13. The pitch of the cut-outs 35, 36 is equal to that of the cut-outs 17. Moreover, the phases of the cut-outs 35, 36 formed in the respective first and second stators 32, 33 are equal to each other.

The inner diameter tip portions of the first and second stators 32, 33 constitute the detecting portion of the sensor 20.

A coil 24 is provided in a region enclosed by the inner peripheral face of the permanent magnet 22 and the axially inner side face of the first stator 32 and the axially outer side face of the second stator 33. The construction is thus such that a voltage changing at a frequency proportional to the rotational speed of the tone wheel 13 is induced in the coil 24 due to a change in the density of the magnetic flux flowing in the permanent magnet 22, first stator 32 and second stator 33.

In particular, with the speed sensing rolling bearing unit of the present invention, when the portions of the metal plate are punch-formed so as to form the cutouts, the punching direction is controlled. That is to say, the punching is carried out from the surface which does not face the small gap 25 towards the surface which faces the small gap 25, so that when the members formed with the cutouts are assembled at their predetermined locations, the surface positioned on the rear side in the punching direction faces the small gap 25.

In the case of the present embodiment, when the cut-outs 17, 35, and 36 are respectively formed by punching in the tone wheel 13, and in the first and second stators 32, 33, the respective punching directions are controlled; as shown in FIGS. 2(A) and 2(B) for the cut-outs 17, and as shown in FIGS. 3(A), 3(B) and 3(C) for the cut-outs 35 and 36.

At first, when forming the cut-outs 17, then as shown in FIG. 2 (A) the outer peripheral face of the smaller diameter portion 14 (the encoder portion of the tone wheel 13), is supported by a support die 37. A punch 34 is then displaced from the inner diameter side of the smaller diameter portion 14 to the outer diameter side, to thereby punch-form the cut-outs 17 with column or tongue portions left between the cutouts. Consequently, a sagging 38 is formed on the inner diameter surface of the column or tongue portions between the cut-outs 17 as shown in FIG. 2(B). Generally, the size of the sagging 38 ranges from 0.08 T to 0.21 T where T is the plate thickness.

With the present embodiment, the sensor 20 faces the outer diameter surface of the smaller diameter portion 14 of the tone wheel 13, and on this side there is substantially no sagging 38, or if any, it is sized up to 0.08 T.

In the case where the punching flash on the outer diameter surface is excessively large, this is removed.

In forming the cut-outs, specifically notches 35 in the first stator 32, then as shown in FIG. 3(A), a support die (not shown) is abutted against a first face (left face in FIG. 3) of a steel plate 31 constituting the first stator 32, while a punch 34 is positioned close to a second face (right face in FIG. 3). In this way, the formed portion of the cut-out 35 is formed with a sagging 38 in the second face as shown in FIG. 3(B). Then as shown in FIG. 3(C), the second face is bent inwards to form the first stator 32. When the first stator 32 is finally assembled to make up the sensor 20 as shown in FIG. 1, the surface with the sagging 38 is positioned on the side which does not face the small gap 25, while the surface without the sagging 38 faces the tone wheel 13 across the small gap 25. The edge corner 50 defining the cutout on the side facing the small gap 25 is sharper than the edge corner 51 defining the cutout on the side remote from (i.e. facing away from) the small gap.

The cut-outs 36 formed in the second stator 33, are formed in a similar manner to the cut-outs 35.

When forming the cut-outs 35, instead of the above-mentioned method, another method may be considered which involves first bending the steel plate 31 to an L-shape in cross-section, and then punching the cut-outs 35 in a direction from the outer peripheral face of the stator 32 to the inner peripheral face. However, with this method, the cut-outs 35 cannot be formed into an L-shape as shown in FIG. 3(C). In other words, the cut-outs 35 can be formed only in the cylindrical portion of the stator 32, and cannot be formed as cut-outs 35 extending to the ring portion of the stator 32 (see FIG.3(C)). The outer peripheral rim of the ring portion will thus oppose the outer peripheral face of the smaller diameter portion 14 of the tone wheel 13 around the whole periphery. Therefore, the magnetic flux can escape through this portion thus compromising any improvement in output from the sensor 20. Therefore, the cut-outs 35 formed in the first stator 32 are punch-formed prior to bending the steel plate 31 to an L-shape in cross-section.

On the other hand with the cut-outs 36 formed in the second stator 33 these may be punch-formed either prior to bending the steel plate 31 to an L-shape in cross-section, or even after bending to an L-shape in cross-section.

This is because with the embodiment shown in the figures, the outer peripheral rim of the ring portion of the second stator 33 does not face the smaller diameter portion 14, and hence magnetic flux leakage is unlikely. However, when the smaller diameter portion 14 extends into the vicinity of the outer peripheral rim of the ring portion of the stator 33, then as with the first stator 32, it is necessary form the cut-outs 36 prior to bending.

Since the respective cut-outs 17, 35 and 36 are formed in the above manner, then the sagging 38 accompanying punch forming is not present on the mutually opposing faces of the tone wheel 13, and the first and second stators 32, 33. Therefore the change in magnetic flux per unit time flowing in the tone wheel 13, first stator 32 and second stator 33 is increased, resulting in an improvement in the output voltage from the sensor 20.

Figure 4:
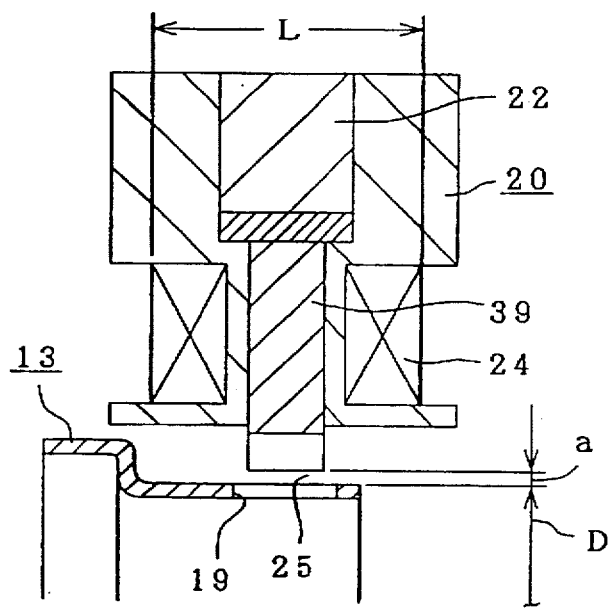
FIG. 4 is a cross-sectional view showing the main portions of an apparatus used in an experiment to verify the results of the present invention.

Next is a description of an experiment carried out by the inventor to verify the effects of the present invention. This experiment was carried out using an apparatus such as shown in FIG. 4 to investigate the amount of change in the output voltage from the sensor for the case with the sagging at the rim of the cut-outs formed in the tone wheel on the side facing the sensor, and for the case with no sagging on this side.

The tone wheel 13 was externally secured to a rotating shaft (not shown in the figure), and a sensor 20 positioned around the tone wheel 13. The sensor 20 comprised a permanent magnet 22, a stator 39, and a coil 24.

Two types of tone wheels 13 were prepared. That is to say, one with through holes 19 (for cutouts) punched in a direction from the outer peripheral side of the tone wheel 13 to the inner peripheral side, so that the sagging was formed on the outer peripheral face (comparative construction), and one with the through holes 19 punched in a direction from the inner peripheral side to the outer peripheral side, so that the sagging was not formed on the outer peripheral face (construction of the present invention).

With both of the tone wheels 13, the outer diameter D was 49.5 mm, and the width "a" of the small gap 25 was 0.8 mm. Moreover, with the coil 24, the outer diameter L was 19 mm, the number of windings was 16000, and the resistance was 10K ohms.

Figure 5:
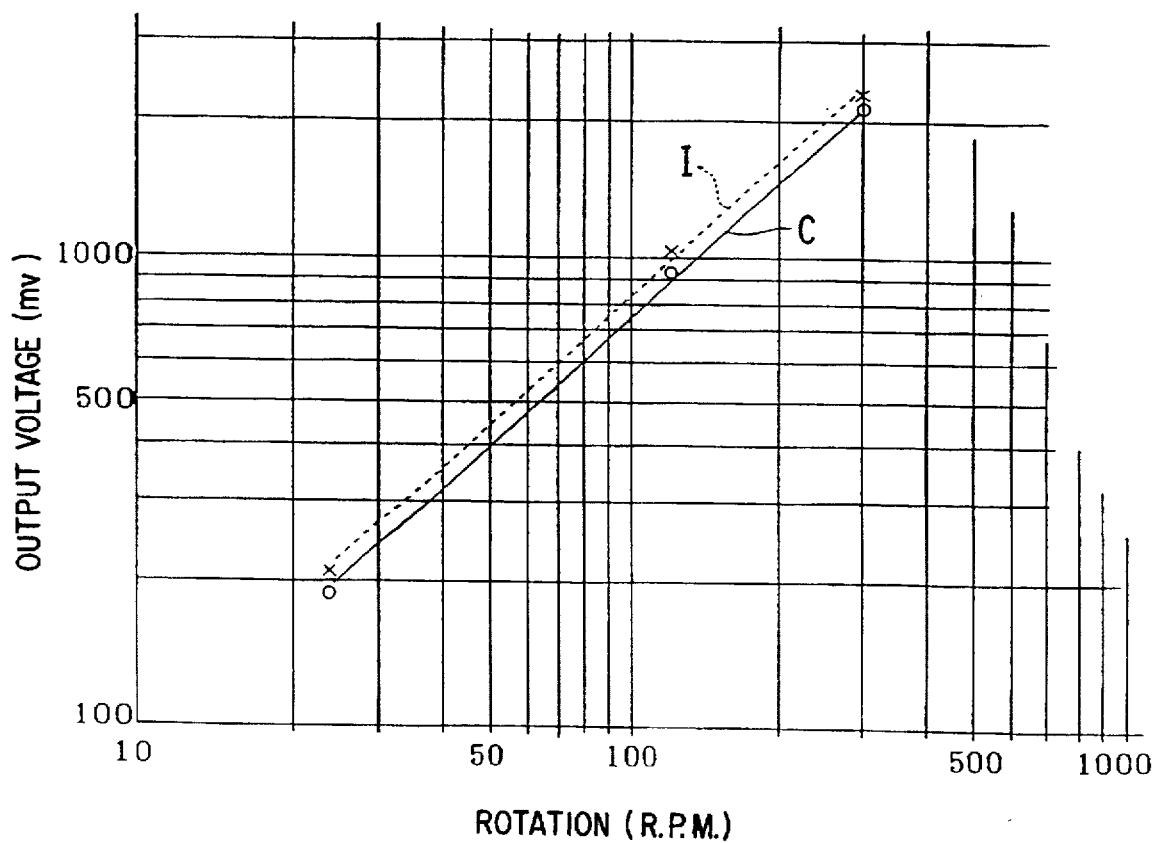
FIG. 5 is a graph showing experimental results.

The results of the experiment are shown in FIG. 5. In FIG. 5, the abscissa represents the tone wheel rotational speed (r.p.m.) while the ordinate represents the sensor output voltage (mV). In FIG. 5, the measured results for the comparative construction are shown by a full line C, while those for the present invention construction are shown by a broken line I. As is clear from FIG. 5, with the construction of the present invention (the construction wherein the surface with the sagging does not face the mating member), the sensor output voltage was improved. In the present experiments, the sensor output voltage was increased by from 10 to 15%.

With the abovementioned first embodiment, the punching direction was controlled so that none of the cut-outs 17, 35, 36 respectively formed in the tone wheel 13 and in the first and second stators 32, 33, had a sagging on the surface opposing the small gap 25. However, as is clear from the above experiment, if at least one of the cut-outs of the respective cut-outs 17, 35 and 36 is made according to the present invention, then the output voltage from the sensor 20 can be increased. In particular, when the punching direction is controlled for all of the cutouts as with the first embodiment, then the output voltage from the sensor can be improved the most.

Figure 6:
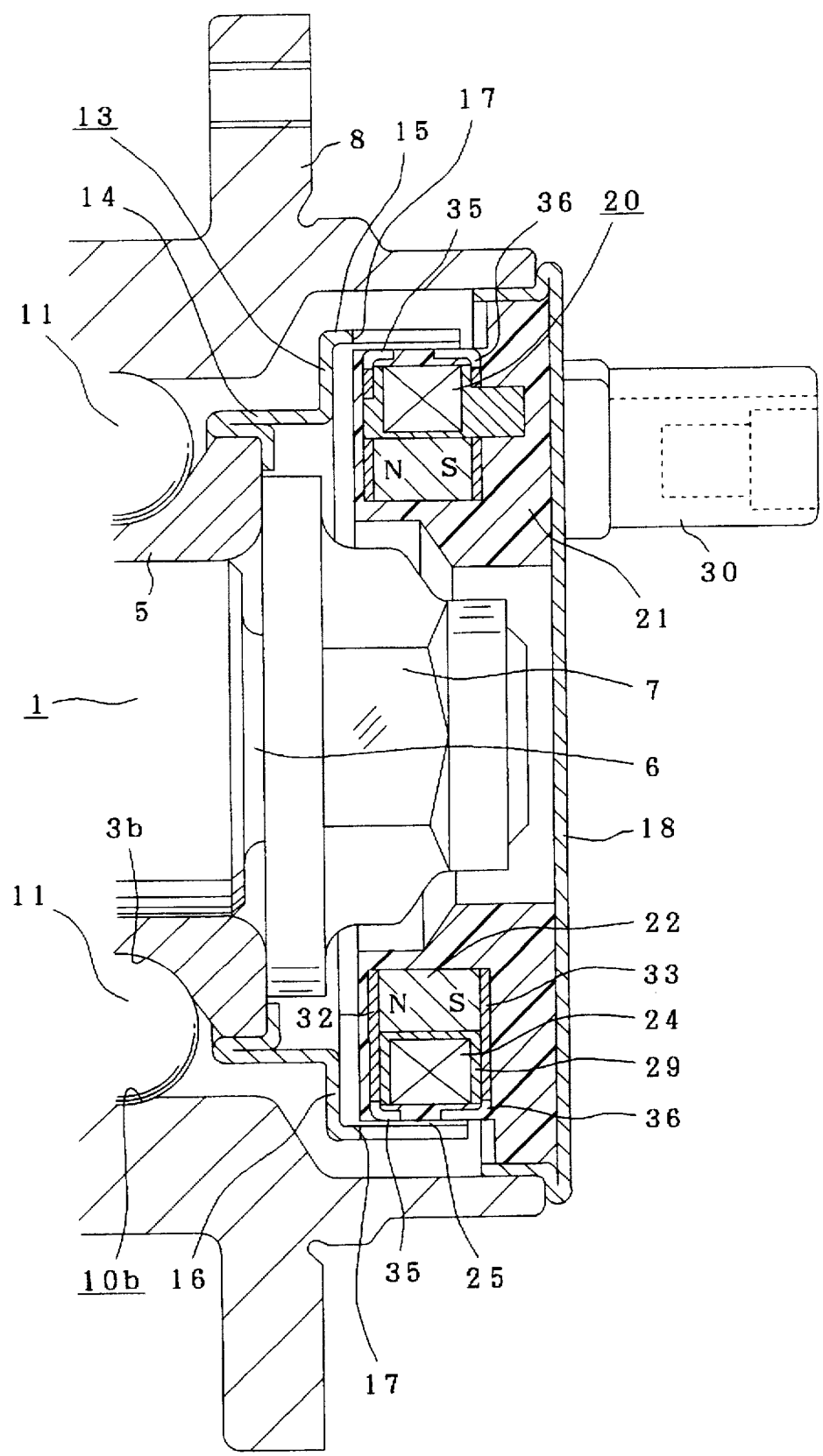
FIG. 6 is a cross-sectional view, similar to that of FIG. 1, showing a second embodiment of the present invention.

FIG. 6 shows a second embodiment of the present invention. With this embodiment, the cross-sectional shape of the tone wheel 13 is formed in the shape of a crank with an axially inner end rim of a smaller diameter portion 14 and an axially outer end rim of a larger diameter portion 15 connected together by a step portion 16. With this tone wheel 13, the smaller diameter portion 14 is secured to an inner ring 5 by externally engaging with an axially inner end portion of the inner ring 5. With the tone wheel 13 secured to the inner ring 5 in this way, the larger diameter portion 15 is positioned around a nut 7 used to secure the inner ring 5. Cut-outs, specifically notches 17 are formed on the larger diameter portion 15 at even spacing around the circumference.

The sensor 20 comprises; a permanent magnet 22, first and second stators 32, 33 formed in respective L-shapes in cross-section from steel plate, and a coil 24. The permanent magnet 22, first stator 32, second stator 33 and coil 24 are respectively formed in an annular shape, and embedded in a synthetic resin body 21.

The inner diameter tip portion on the axially inner side face of the first stator 32 is abutted against the axially outer end face (left end face in FIG. 6) of the permanent magnet 22, while the outer diameter tip portion of the first stator 32 opposes a central portion on an inner peripheral face of the larger diameter portion 15 across a small gap 25. The inner diameter tip portion on the axially outer side face of the second stator 33 is abutted against the axially inner end face (right end face in FIG. 6) of the permanent magnet 22, while the outer peripheral face of the second stator 33 opposes the tip end (right end in FIG. 6) of the inner peripheral face of the larger diameter portion 15, again across the small gap 25.

Respective cut-outs 35, 36 are formed in the outer end portions of the first and second stators 32, 33, respectively, so that the respective portions are in the form of comb teeth. The pitch (central angle pitch) of the cut-outs 35, 36 is of course made equal to that of cut-outs 17 formed in the large diameter portion 15 of the tone wheel 13. Moreover, the phases of the cut-outs 35, 36 formed in the respective first and second stators 32, 33 are equal to each other. With this embodiment, the direction of punch-forming the respective cut-outs 17, 35 and 36 is controlled so that the surface without the sagging accompanying punching, faces the small gap 25, thus improving the output from the sensor 20.

Figure 7:
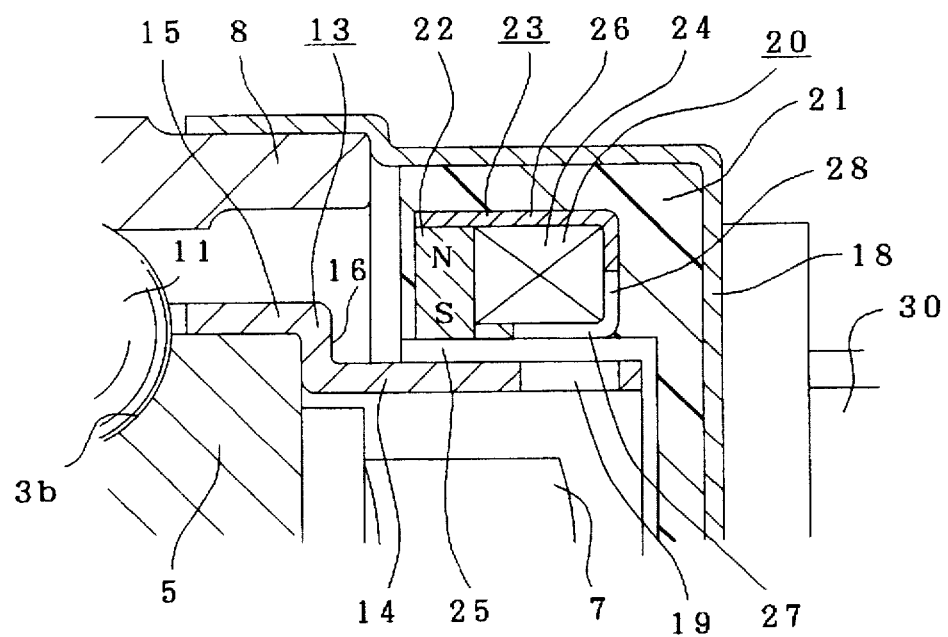
FIG. 7 is a cross-sectional view corresponding to part (V) of FIG. 9, showing a third embodiment of the present invention.
Figure 9:
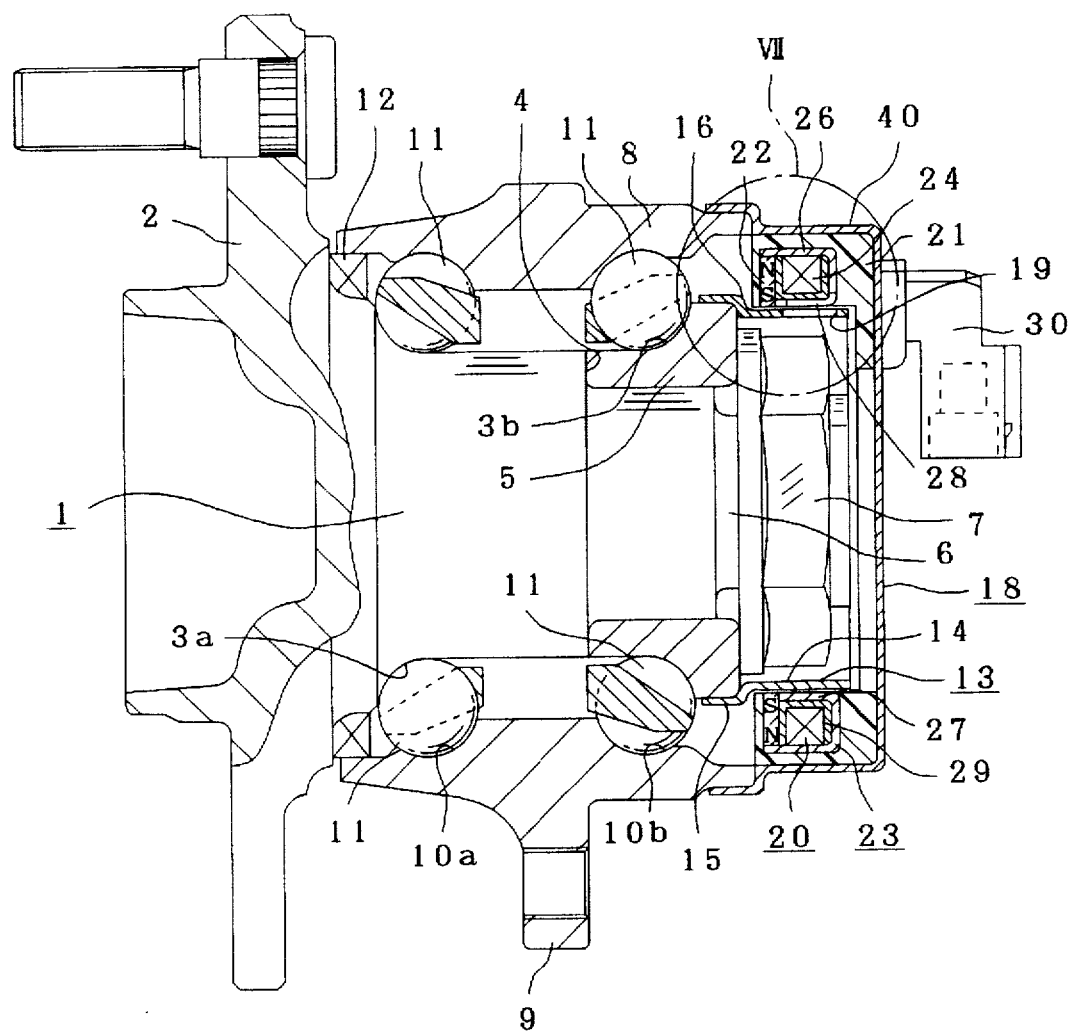
FIG. 9 is a cross sectional view showing a second example of a conventional construction.
Figure 10:
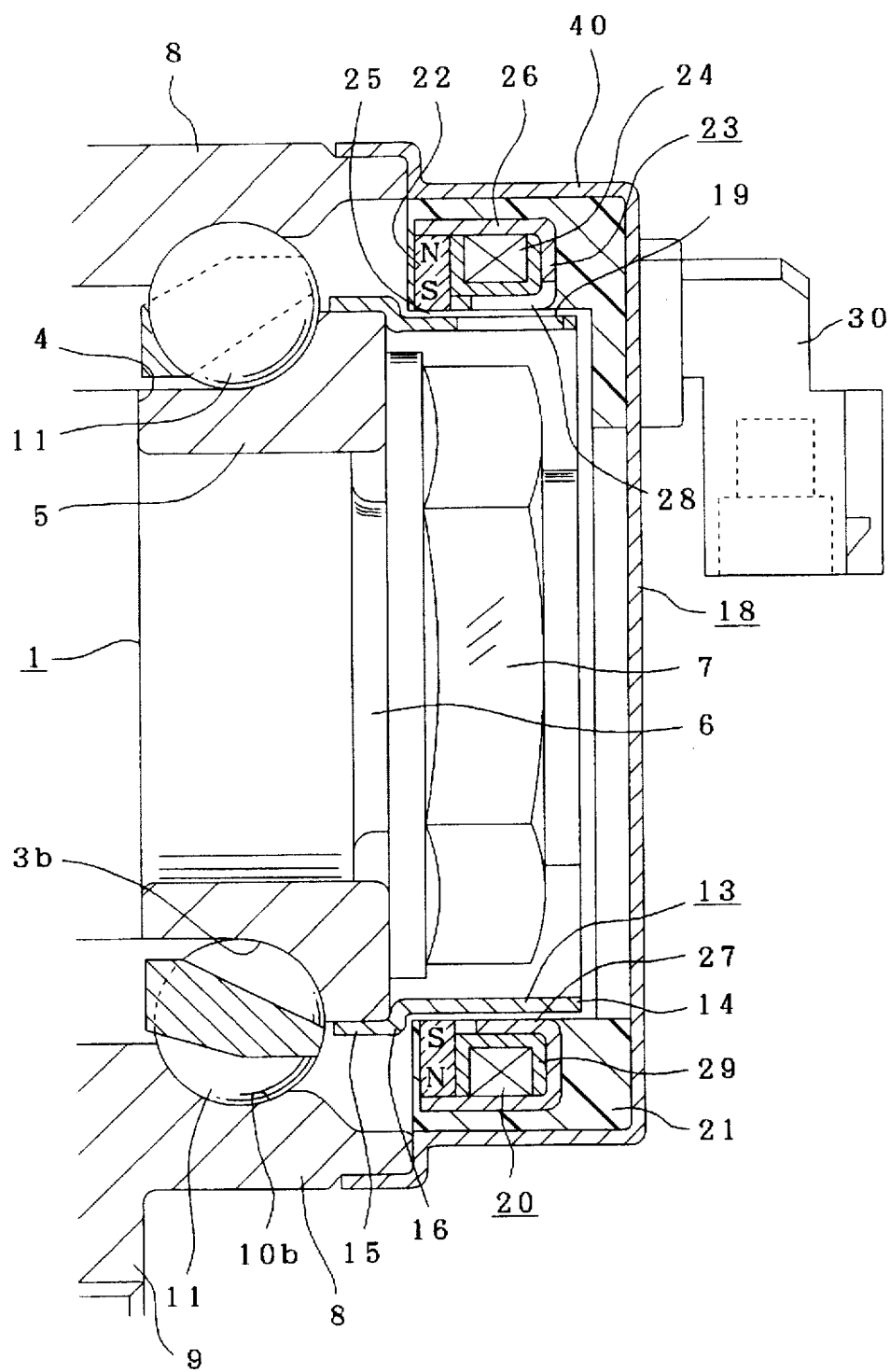
FIG. 10 is an enlarged cross sectional views showing the right part of FIG. 9.

FIG. 7 shows a third embodiment of the present invention. With this embodiment, the present invention is applied to a conventional construction shown in FIGS. 9 and 10. With this embodiment also, the punching direction in forming cutouts, specifically through holes 19 in a tone wheel 13, and in forming notches 28 in the stator 23 is controlled so that the surface without the roll over faces the small gap, thus improving the output from the sensor 20.

The present invention may also be applied to other constructions apart from those mentioned above, wherein cutouts are made by punch forming a magnetic metal plate, such as with notches or through holes, in at least one of the detector portion of the sensor and the encoder portion of the tone wheel which are opposed to each other.

For example, the present invention can be applied to constructions wherein the sensor faces the tone wheel in the thrust direction.

Figure 8:
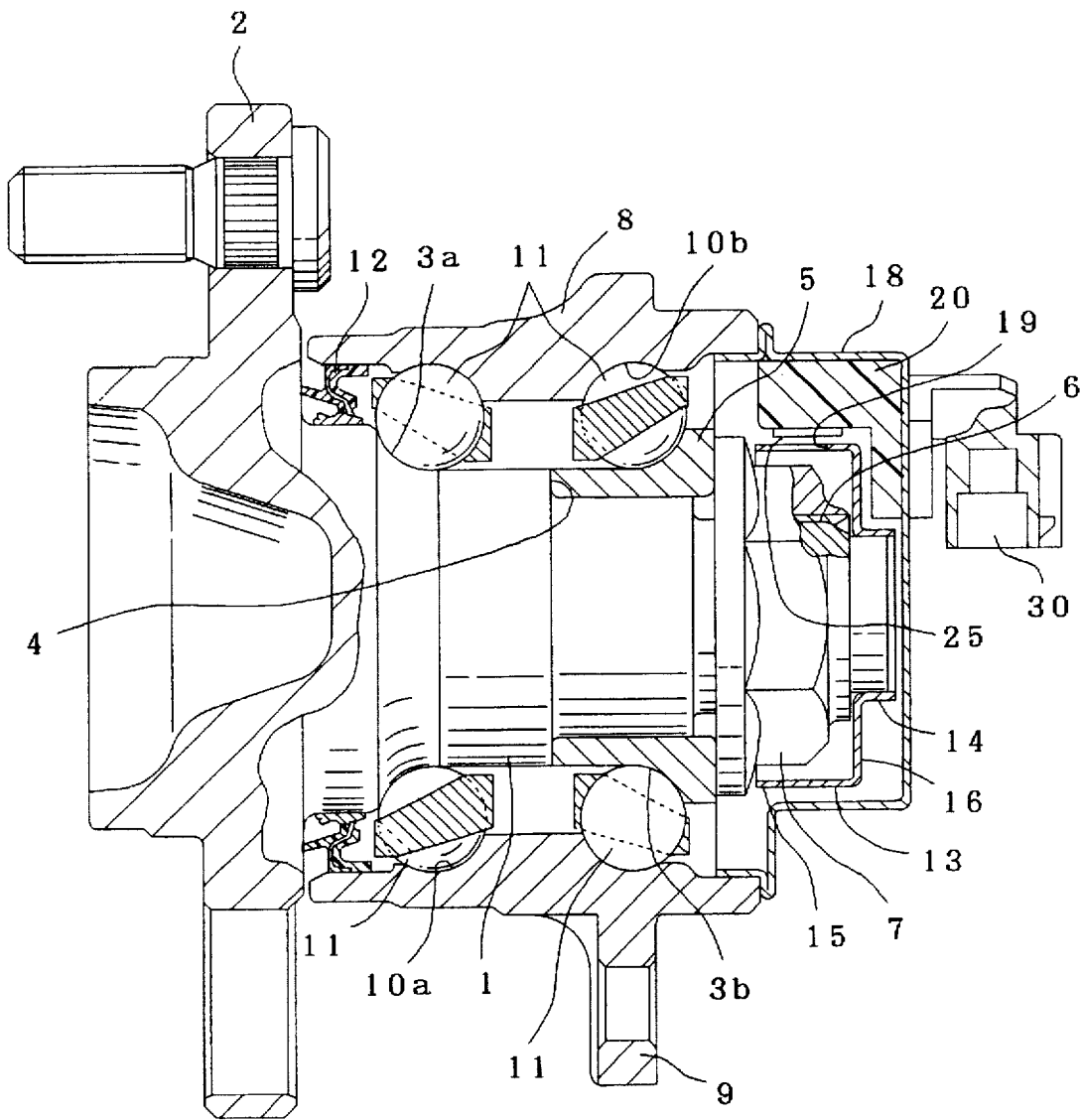
FIG. 8 is a cross-sectional view showing a first example of a conventional construction.

Moreover, the invention may be applied to a construction such as shown in FIG. 8 wherein the sensor is not an annular shape.

Furthermore, in contrast to the abovementioned respective embodiments, the invention may be applied to constructions wherein the outer ring is rotatable and the inner ring is stationary.

With the speed sensing rolling bearing unit of the present invention constructed and operated as described above, an improvement in the sensor output voltage can be achieved, particularly without any increase in cost. Moreover, this improvement in output voltage can be achieved without an increase in the number of parts. Therefore, the speed sensing rolling bearing unit can be of a reduced size and weight for the same output voltage as for the conventional arrangement.

What is claimed is:

1. A rolling bearing unit with rotating speed sensor comprising a stationary ring having a first raceway on a peripheral surface thereof, a rotatable ring placed concentric with the stationary ring and having a second raceway on a peripheral surface thereof, such that the first and second raceways are opposed to each other, a plurality of rolling elements provided between the first and second raceways, a magnetic tone wheel supported by the rotatable ring to rotate together with the rotatable ring and having an encoder portion, and a sensor supported by the stationary ring to be opposed to the tone wheel and having a detecting portion, such that the detecting portion and the encoder portion are opposed to each other with a small gap therebetween, that at least one of the detecting portion and the encoder portion is made from a magnetic metal plate and is formed with a plurality of cutouts spaced at a pitch so as to alternately change the magnetic characteristic in a circumferential direction, said cutouts being defined by a first edge corner on a side of the magnetic metal plate faced to the small gap and by a second edge corner on a side of the magnetic metal plate facing away from the small gap, said first edge corner being sharper than said second edge corner.

2. A rolling bearing unit with rotating speed sensor comprising a stationary ring having a first raceway on a peripheral surface thereof, a rotatable ring placed concentric with the stationary ring and having a second raceway on a peripheral surface thereof, such that the first and second raceways are opposed to each other, a plurality of rolling elements provided between the first and second raceways, a magnetic tone wheel supported by the rotatable ring to rotate together with the rotatable ring and having an encoder portion, and a sensor supported by the stationary ring to be opposed to the tone wheel and having a detecting portion, such that the detecting portion and the encoder portion are opposed to each other with a small gap therebetween, that at least one of the detecting portion and the encoder portion is made from a magnetic metal plate and is formed with a plurality of cutouts spaced at a pitch so as to alternately change the magnetic characteristic in a circumferential direction, said cutouts being defined by a first edge corner on a side of the magnetic metal plate faced to the small gap and by a second edge corner on a side of the magnetic metal plate facing away from the small gap, said first edge corner being sharper than said second edge corner, wherein the cutouts in the at least one of the detecting portion and the encoder portion are produced through a punching stroke from the side of the magnetic metal plate which is not faced to the small gap to the side of the magnetic metal plate which is faced to the small gap in the assembled state.

3. A rolling bearing unit with rotating speed sensor comprising a stationary ring having a first raceway on a peripheral surface thereof, a rotatable ring placed concentric with the stationary ring and having a second raceway on a peripheral surface thereof, such that the first and second raceways are opposed to each other, a plurality of rolling elements provided between the first and second raceways, a magnetic tone wheel supported by the rotatable ring to rotate together with the rotatable ring and having an encoder portion, and a sensor supported by the stationary ring to be opposed to the tone wheel and having a detecting portion, such that the detecting portion and the encoder portion are opposed to each other with a small gap therebetween, that at least one of the detecting portion and the encoder portion is made from a magnetic metal plate and is formed through punch-pressing with a plurality of cutouts spaced at a pitch and column or tongue portions between the cutouts so as to alternately change the magnetic characteristic in a circumferential direction, and that the column or tongue portions have an edge corner faced to the small gap where a sagging radially produced through the punch-pressing is sized up to 0.08 T provided that T is the plate thickness of the column or tongue portions.

* * * * *